(12) United States Patent
Liu et al.

(10) Patent No.: US 7,824,041 B2
(45) Date of Patent: Nov. 2, 2010

(54) ADJUSTING APPARATUS FOR PROJECTOR

(75) Inventors: Chang-Chun Liu, Shenzhen (CN); Guo-Fu Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 423 days.

(21) Appl. No.: 11/965,768

(22) Filed: Dec. 28, 2007

(65) Prior Publication Data

US 2009/0153810 A1      Jun. 18, 2009

(30) Foreign Application Priority Data

Dec. 14, 2007   (CN)   .................. 2007 1 0203091

(51) Int. Cl.
  *G03B 21/14*   (2006.01)
(52) U.S. Cl. ...................................... 353/119
(58) Field of Classification Search ............... 353/42.5, 353/89, 94, 119, 69, 62, 12, 11, 122; 250/201.1–201.4
  See application file for complete search history.

(56) References Cited

U.S. PATENT DOCUMENTS 1,907,754 A  *  5/1933  Augusto ................. 248/650

* cited by examiner

*Primary Examiner*—Georgia Y Epps
*Assistant Examiner*—Don Williams
(74) *Attorney, Agent, or Firm*—Frank R. Niranjan

(57) ABSTRACT

An adjusting apparatus is provided for a projector and received in a case of the projector. The case includes a front wall defining a through hole. Two protrusions each defining a notch are formed on the inside surface of the front wall. The adjusting apparatus includes two supporting members partially received in the case and movably coupled to the case, and an operating member partially exposed out of the through hole of the front wall of the case. A connecting member is connected to the operating member, and received in the notches. Each supporting member forms a plurality of teeth thereon. The connecting member forms a plurality of teeth at two ends thereof respectively for mating with the teeth of the supporting member. The operating member is rotated for driving the connecting member to move up and down relative to the supporting member.

9 Claims, 3 Drawing Sheets

ADJUSTING APPARATUS FOR PROJECTOR

BACKGROUND

1. Field of the Invention

The present invention relates to adjusting apparatuses, and more particularly to an adjusting apparatus for a projector.

2. Description of Related Art

With the development of electronic technology, projectors have come into wide use in multimedia presentations. Typically, a projector includes an adjusting apparatus installed at a front section or a rear section of the bottom of the projector, for adjusting elevation and depression angles of the projector to meet the needs of a user. The adjusting apparatus includes a foot movably supporting a shell of the projector, and a button. Pressing the button, the foot is moved up or down relative to the shell of the projector. When the projector is adjusted to a proper elevation or depression angle, the button is released and locks the foot to the shell. However, when the button is pressed by one hand of a user, the user needs to support the shell with the other hand and raise or descend the shell relative to the foot. It is difficult and inconvenient.

What is needed, therefore, is an adjusting apparatus which facilitates convenient operating and adjusting elevation and depression angles of a projector.

SUMMARY

An exemplary adjusting apparatus is provided for a projector and received in a case of the projector. The case includes a front wall defining a through hole. Two protrusions each defining a notch are formed on the inside surface of the front wall. The adjusting apparatus includes two supporting members partially received in the case and movably coupled to the case, and an operating member partially exposed out of the through hole of the front wall of the case. A connecting member is connected to the operating member, and received in the notches. Each supporting member forms a plurality of teeth thereon. The connecting member forms a plurality of teeth at two ends thereof respectively for mating with the teeth of the supporting member. The operating member is rotated for driving the connecting member to move up and down relative to the supporting member.

Other advantages and novel features will become more apparent from the following detailed description of embodiment when taken in conjunction with the accompanying drawings, in which:

DETAILED DESCRIPTION

Figure 1:
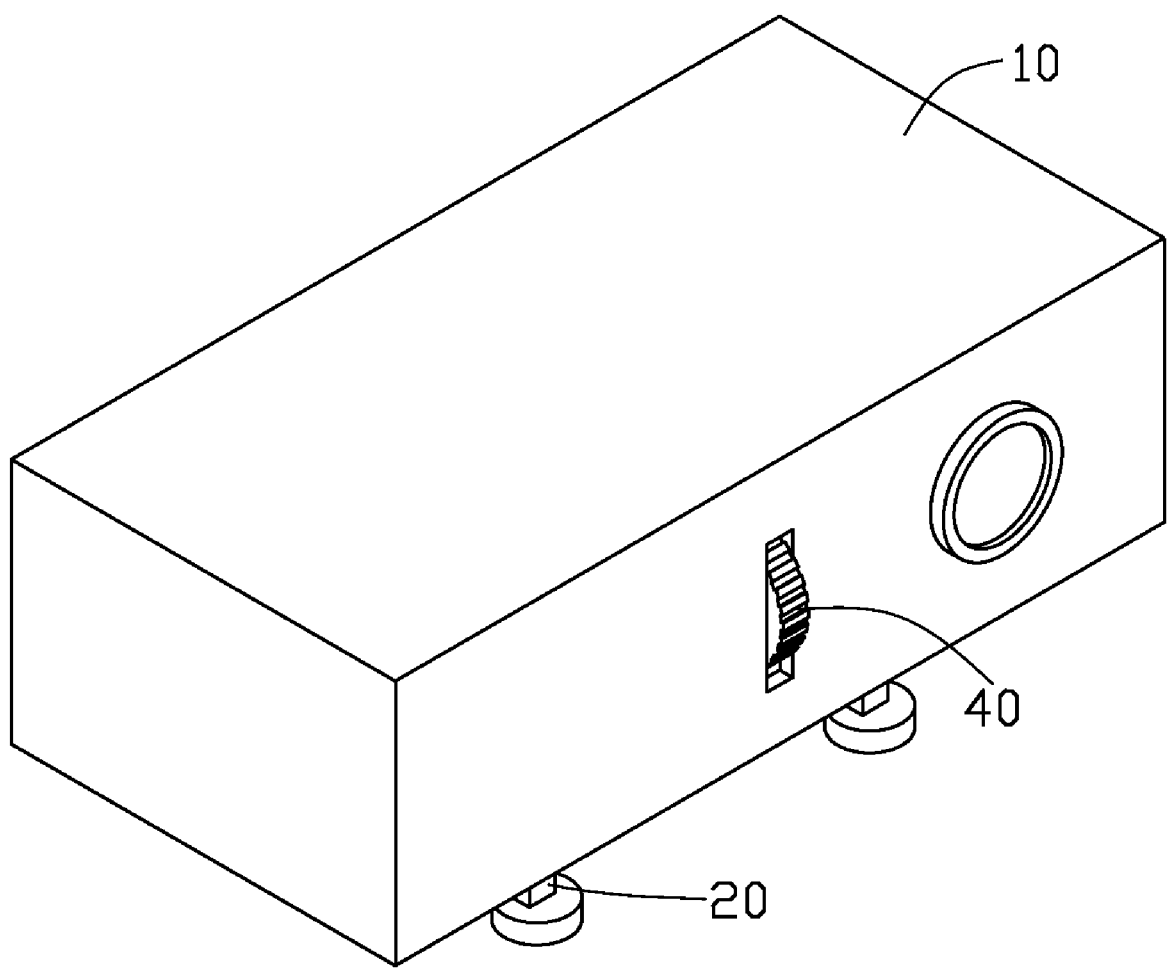
FIG. 1 is an assembled view of an adjusting apparatus with a case of a projector in accordance with an embodiment of the present invention.
Figure 3:
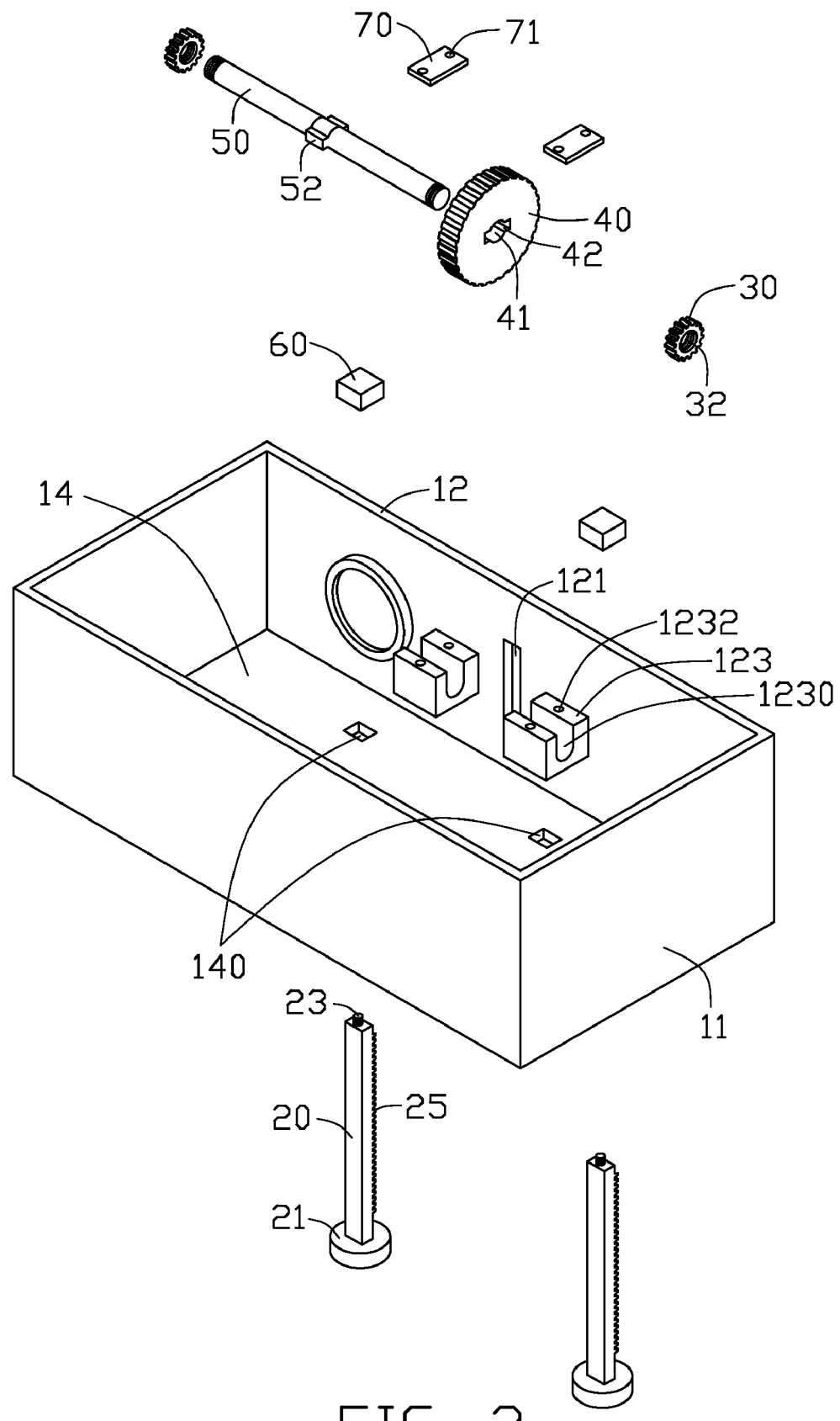
FIG. 3 is an exploded, isometric view of FIG. 2.

Referring to FIGS. 1 and 3, an adjusting apparatus for a projector is provided in accordance with an embodiment of the present invention and received in a case 10 of the projector. The adjusting apparatus includes two supporting members 20, two gears 30 each defining a screw hole 32 therein, an operating member 40, a connecting member 50, two first stop blocks 60 each defining a screw hole therein, and two second stop blocks 70 each defining two screw holes 71 therein.

The case 10 includes a front wall 12, and a bottom wall 14 defining two through holes 140 therein adjacent to the front wall 12. Two horizontally-spaced and aligned U-shaped protrusions 123 are formed on the inside surface of the front wall 12. A slot 121 is defined between the protrusions 123. The space defined between the arms of the U-shape of each protrusion 123 are two notches 1230 and a screw hole 1232 is defined in each arm adjacent each notch 1230.

Each supporting member 20 includes a supporting plate 21 formed at one end thereof, and a threaded portion formed at the other end 23 thereof, and a plurality of teeth 25 formed at a middle portion thereof.

The operating member 40 defines a through hole 41 in the center thereof. Two notches 42 are respectively defined in the operating member 40 at opposite sides of and communicating with the through hole 41.

The connecting member 50 is a pole threaded at both ends with two protrusions 52 formed on a middle of the connecting member 50 and configured to be received in the notches 42 of the operating member 40.

Figure 2:
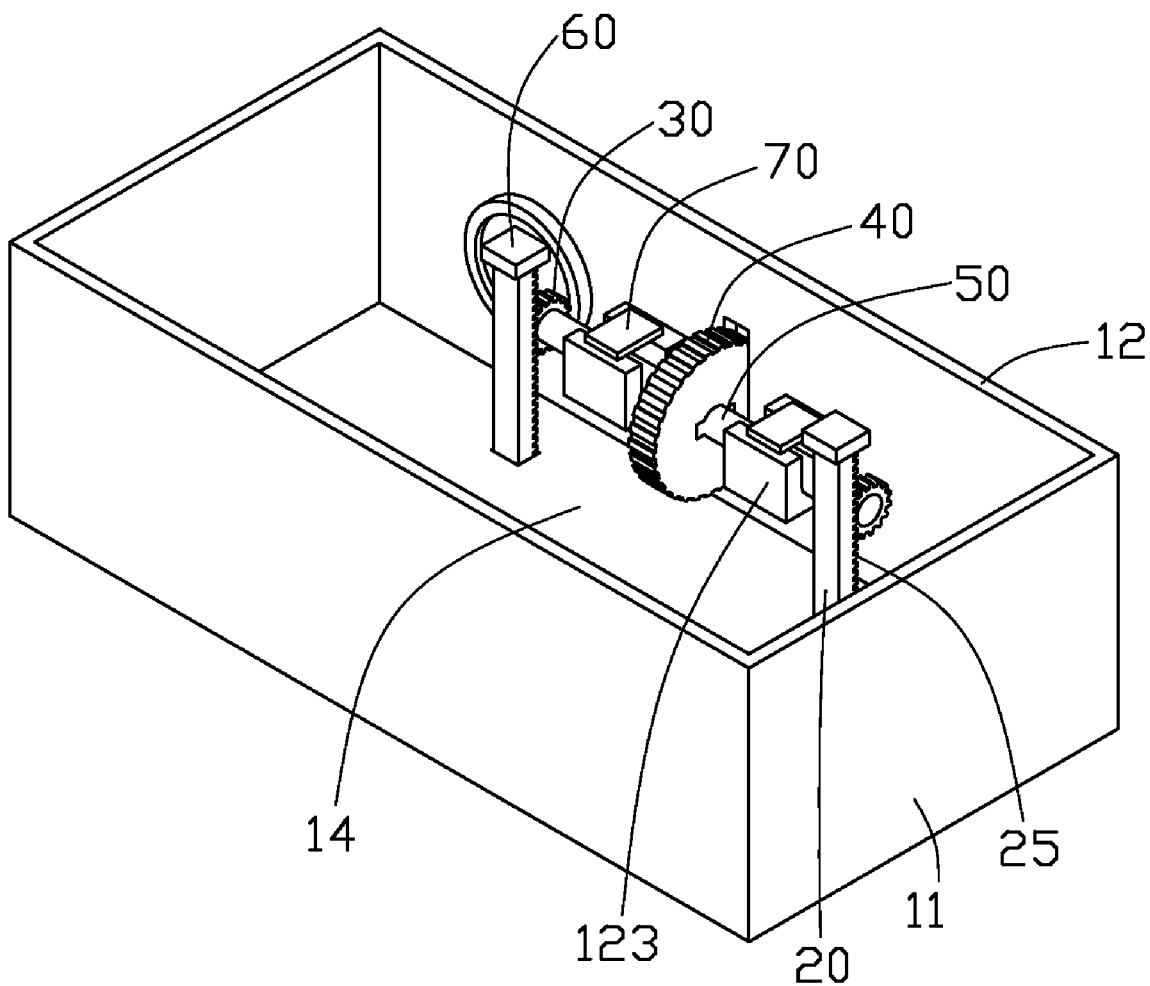
FIG. 2 is similar to FIG. 1, but with a top wall removed from the case.

Referring further to FIGS. 1 and 2, in assembly, the connecting member 50 inserts through the through hole 41 of the operating member 40, and the protrusions 52 of the connecting member 50 are fittingly received in the notches 42 of the operating member 40 respectively. The connecting member 50 is supported in the notches 1230 of the protrusions 123 of the front wall 12, and part of the operating member 40 extends out of the through hole 121 of the front wall 12. Each second stop block 70 is fixed to the corresponding protrusion 123 via two fasteners screwed through two screw holes 71 in two screw holes 1232 of each protrusion 123 to stop the connecting member 50 from sliding out of the notches 1230. The gears 30 are screwed into the threaded portions of the connecting member 50 respectively. The supporting members 20 extend through the through holes 140 of the bottom wall 14 respectively to make the teeth 25 of the supporting members 20 engage with the gears 30 respectively. The free ends 23 of the supporting members 20 are screwed in the first stop blocks 60 respectively. Thereby, the first stop blocks 60 are coupled to the supporting members 20 respectively, for preventing the supporting members 20 from disengaging from the gears 30 respectively.

The case 10 is placed on a plane, with the supporting plate 21 of the supporting members 20 and a rear portion of the bottom wall 14 contacting the plane. When there is a need to adjust the elevation or depression angle of the projector, the operating member 40 is rotated. The gears 30 rotate together with the operating member 40 to drive the corresponding supporting members 20 causing the case 10 to move up or down relative to the supporting members. Thereby, a front portion of the case 10 is moved down or up relative to the supporting plate 21 on the plane, and the elevation or depression angle of the projector is changed.

In an alternative embodiment, a plurality of teeth can be formed on each end of the connecting member 50 for mating with the teeth 25 of the supporting members 20.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. An adjusting apparatus for being received in a case of a projector,
the case comprising a front wall defining a through hole, two protrusions each defining a notch and formed on the inside surface of the front wall, the adjusting apparatus comprising:
two supporting members partially received in the case and movably coupled to the case, each of the supporting members forming a plurality of teeth thereon;
an operating member partially exposed out of the through hole of the front wall of the case; and
a connecting member connected to the operating member, and rotatable received in the notches around an axis, the connecting member forming a plurality of teeth at two ends thereof for mating with the teeth of the supporting members, wherein the operating member is fittingly sleeved around the connecting member to rotate together with the connecting member around the same axis, and wherein the operating member is rotated for driving the connecting member to move up and down relative to the supporting member.

2. The adjusting apparatus as claimed in claim 1, wherein the connecting member forms a protrusion, the operating member defines a through hole having a notch, the connecting member is inserted through the through hole, and the protrusion of the connecting member is clamped in the notch of the operating member to rotate together with the operating member around the same axis.

3. The adjusting apparatus as claimed in claim 1, wherein each of the supporting members forms a supporting plate at one end thereof for supporting the projector.

4. The adjusting apparatus as claimed in claim 3, wherein the case includes a bottom wall defining two through holes therein, the other end of each of the supporting members extends through the corresponding through hole and is coupled to a first stop block.

5. The adjusting apparatus as claimed in claim 1, wherein two second stop blocks are mounted to the protrusions respectively to stop the connecting member from sliding out of the notches.

6. An adjusting apparatus for being received in a case of a projector,
the case comprising a front wall defining a through hole, two protrusions each defining a notch and formed on the inside surface of the front wall, the adjusting apparatus comprising:
two supporting members partially received in the case and movably coupled to the case, each of the supporting members forming a plurality of teeth thereon;
a connecting member being a shaft, and rotatable received in the notches around an axis of the shaft;
an operating member being a round plate fittingly sleeved around the connecting member, and concentric with the connecting member, the operating member leaving part of its circumference exposed out of the through hole of the front wall of the case for manual operation; and
two gears coupled to opposite ends of the connecting member and mating with the teeth of the supporting members, the operating member being rotated to drive the connecting member and the gears to rotate together around the same axis of the connecting member, for driving the case to move up and down relative to the supporting member.

7. The adjusting apparatus as claimed in claim 6, wherein the connecting member forms a protrusion, the operating member defines a through hole having a notch, the connecting member is inserted through the through hole, and the protrusion is clamped in the notch of the operating member.

8. The adjusting apparatus as claimed in claim 6, wherein the case includes a bottom wall defining two through holes therein, the other end of each of the supporting members extends through the corresponding through hole and is coupled to a first stop block.

9. The adjusting apparatus as claimed in claim 6, wherein two second stop blocks are mounted to the protrusions respectively to stop the connecting member from sliding out of the notches.

* * * * *